United States Patent [19]

(12) United States Patent
Tigerholm

(10) Patent No.: US 7,137,402 B2
(45) Date of Patent: Nov. 21, 2006

(54) OIL DEAERATION DEVICE

(75) Inventor: Lars Tigerholm, Stockholm (SE)

(73) Assignee: Tigerholm Products AB, Ekero (SE)

( * ) Notice: Subject to any disclaimer, the term of this patent is extended or adjusted under 35 U.S.C. 154(b) by 124 days.

(21) Appl. No.: 10/501,994

(22) PCT Filed: Jan. 16, 2003

(86) PCT No.: PCT/SE03/00057

§ 371 (c)(1),
(2), (4) Date: Jan. 10, 2005

(87) PCT Pub. No.: WO03/061807

PCT Pub. Date: Jul. 31, 2003

(65) Prior Publication Data

US 2005/0115608 A1   Jun. 2, 2005

(30) Foreign Application Priority Data

Jan. 21, 2002   (SE) .................................. 0200156
Feb. 26, 2002   (SE) .................................. 0200551

(51) Int. Cl.
*F16K 24/04* (2006.01)

(52) U.S. Cl. ................ 137/202; 137/312; 137/601.2; 96/165

(58) Field of Classification Search ............... 137/202, 137/312, 601.2; 96/165
See application file for complete search history.

(56) References Cited

U.S. PATENT DOCUMENTS 2,751,925 A * 6/1956 Axlander ............... 137/202

| 4,082,106 A | 4/1978 | Butcher |
| 4,589,442 A | 5/1986 | Ernryd |
| 4,708,157 A * | 11/1987 | Sabatino .................... 137/179 |
| 5,259,871 A | 11/1993 | Tigerholm |

FOREIGN PATENT DOCUMENTS

| DE | 39 04 963 | 8/1990 |
| DE | 44 03 476 | 8/1995 |

* cited by examiner

*Primary Examiner*—Eric Keasel
*Assistant Examiner*—Craig Price
(74) *Attorney, Agent, or Firm*—Young & Thompson

(57) ABSTRACT

An oil deaeration device includes a base and an oil housing, the base being equipped with a first and a second inlet, an outlet, a float provided in the oil housing and a diaphragm provided in the oil housing. The oil housing is divided into two chambers, the float is provided in a first chamber, and a further float is provided in a second chamber. It is significant for the oil deaeration device that the diaphragm on one side is connected to the first chamber, that the diaphragm on its other side is connected to the second chamber, that a safety valve is provided in connection with the outlet, and that the safety valve communicates with the outlet in its open position.

9 Claims, 6 Drawing Sheets

OIL DEAERATION DEVICE

TECHNICAL FIELD OF THE INVENTION

The present invention relates to an oil deaeration device that comprises a base and an oil housing, said base being equipped with a first and a second inlet, an outlet, a float provided in the oil housing and a diaphragm provided in the oil housing, that the oil housing is divided into two chambers, that the float is provided in a first chamber, and that a further float is provided in a second chamber.

PRIOR ART

At present there exist two main types of oil deaeration devices. One type controls the oil flow directly by means of a float. In connection therewith rather large forces are required to act on the float and this will negatively affect other functions, e.g. wild foaming. The other type of oil deaeration device controls the oil flow by means of a diaphragm. The control by means of a diaphragm has several advantages due to the servo effect that arises and that the regulation may be affected by a lighter float. A disadvantage in connection with the last mentioned type of oil deaeration device is that one side of the diaphragm must be connected to the atmospheric pressure. If the diaphragm is subjected to a damage, e.g. in the shape of a hole in the diaphragm, oil will flow out in a totally uncontrolled manner and there is a clear risk of environmental damages.

An oil deaeration device having a diaphragm is previously known, and marketed. This oil deaeration device comprises an upper chamber and a lower chamber, said chambers each being equipped with a float.

OBJECTS AND FEATURES OF THE INVENTION

A primary object of the present invention is to present an oil deaeration device having such a design that oil will not leak even if there is a hole in the diaphragm.

Still an object of the present invention is that by ocular inspection of the oil deaeration device a first fault diagnosis is made.

A further object of the present invention is that the oil deaeration device in principle should not be affected by the pressure that exists in the inlet pipe.

At least the primary object of the present invention is realised by means of an oil deaeration device that has been given the features of the appending claim 1. Preferred embodiments are defined in the dependent claims.

BRIEF DESCRIPTION OF THE DRAWINGS

Below a preferred embodiment of the invention will be described with reference to the enclosed drawings, where.

DETAILED DESCRIPTION OF PREFERRED EMBODIMENTS OF THE INVENTION

Figure 1:
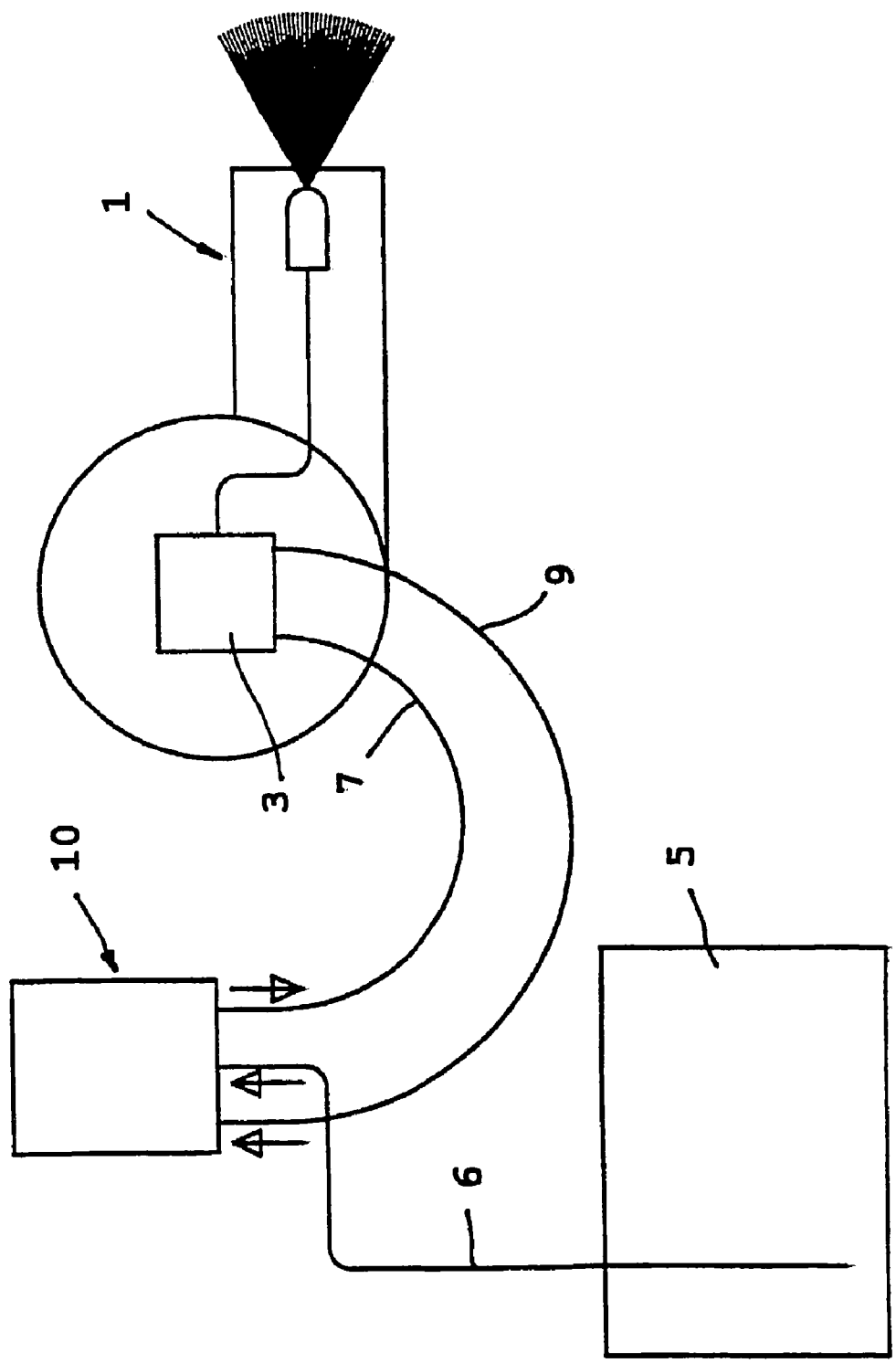
FIG. 1 shows schematically an oil supply installation, which includes an oil deaeration device according to the present invention.

The oil supply installation, schematically shown in FIG. 1, comprises an oil burner 1 that is equipped with a pump 3 that is connected both to an inlet pipe 7, coming from an oil deaeration device 10 according to the present invention, and to a return pipe 9 going back to the oil deaeration device 10. A supply pipe 6 extends from an oil tank 5 to the oil deaeration device 10.

Figure 2:
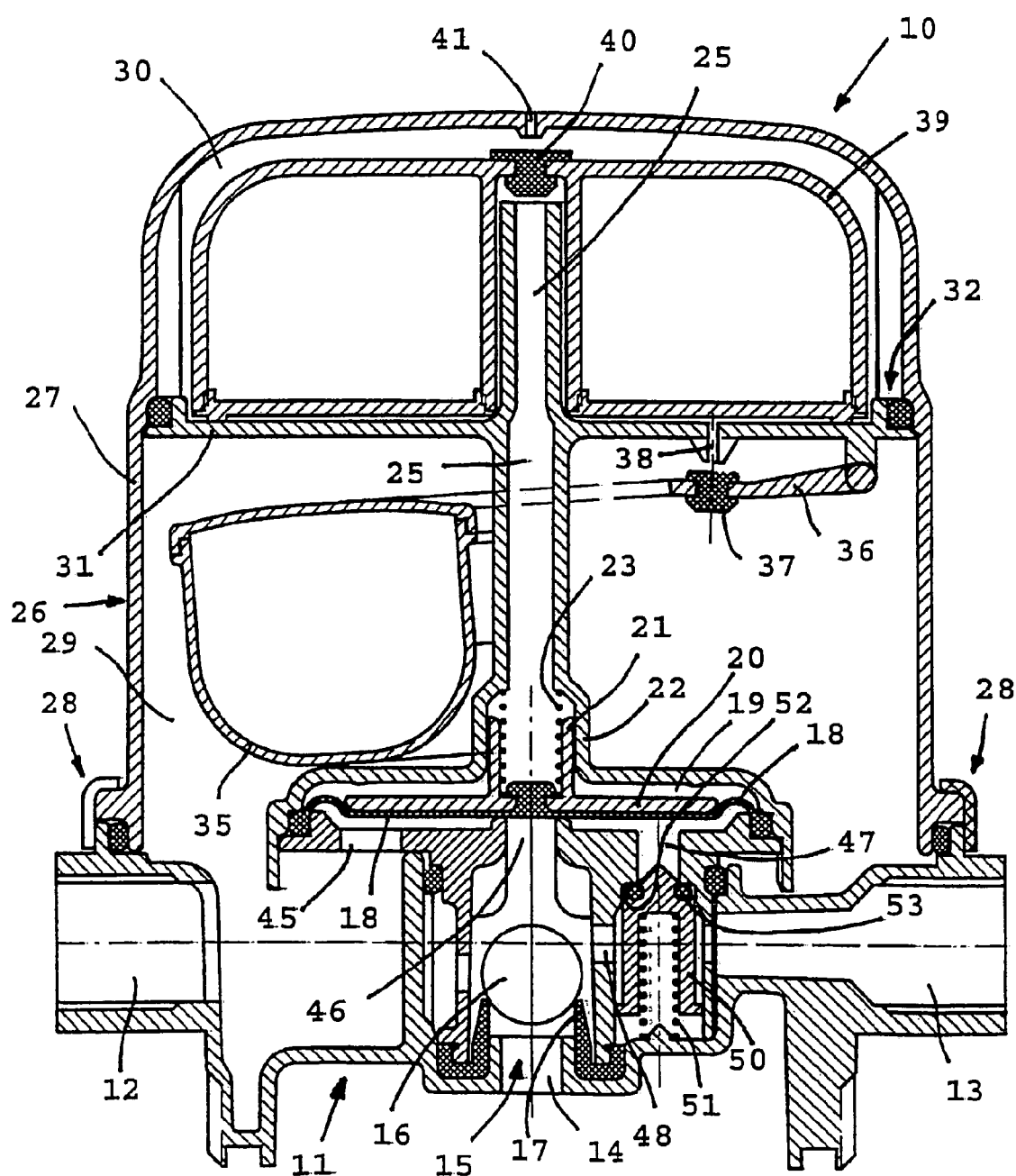
FIG. 2 shows a vertical section through an oil deaeration device according to the present invention, said oil deaeration device being in inactive position, i.e. it contains no oil.
Figure 3:
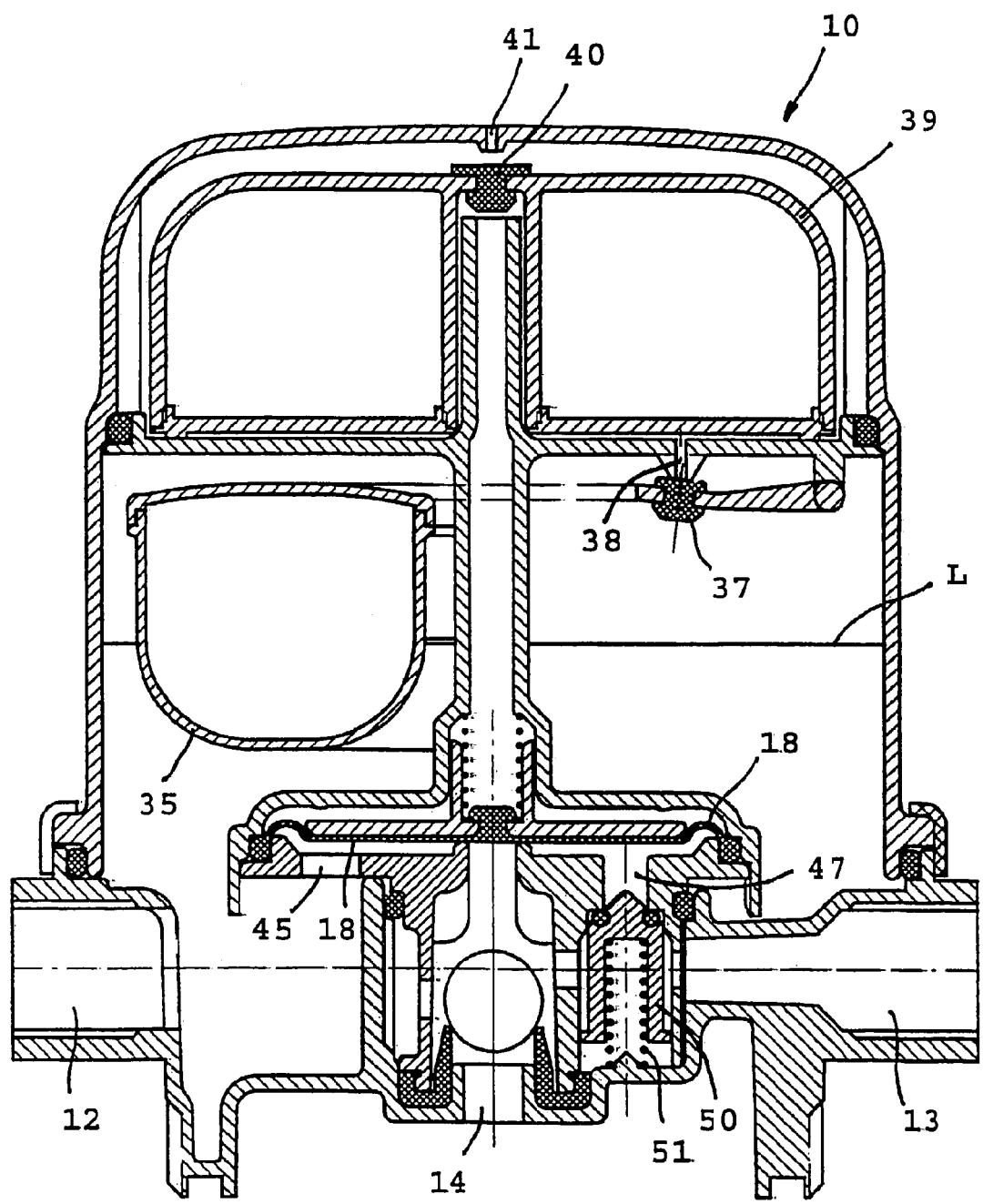
FIG. 3 shows a vertical section through the oil deaeration device according to FIG. 2 when the oil level has risen to such a level that a lower float has been elevated.
Figure 4:
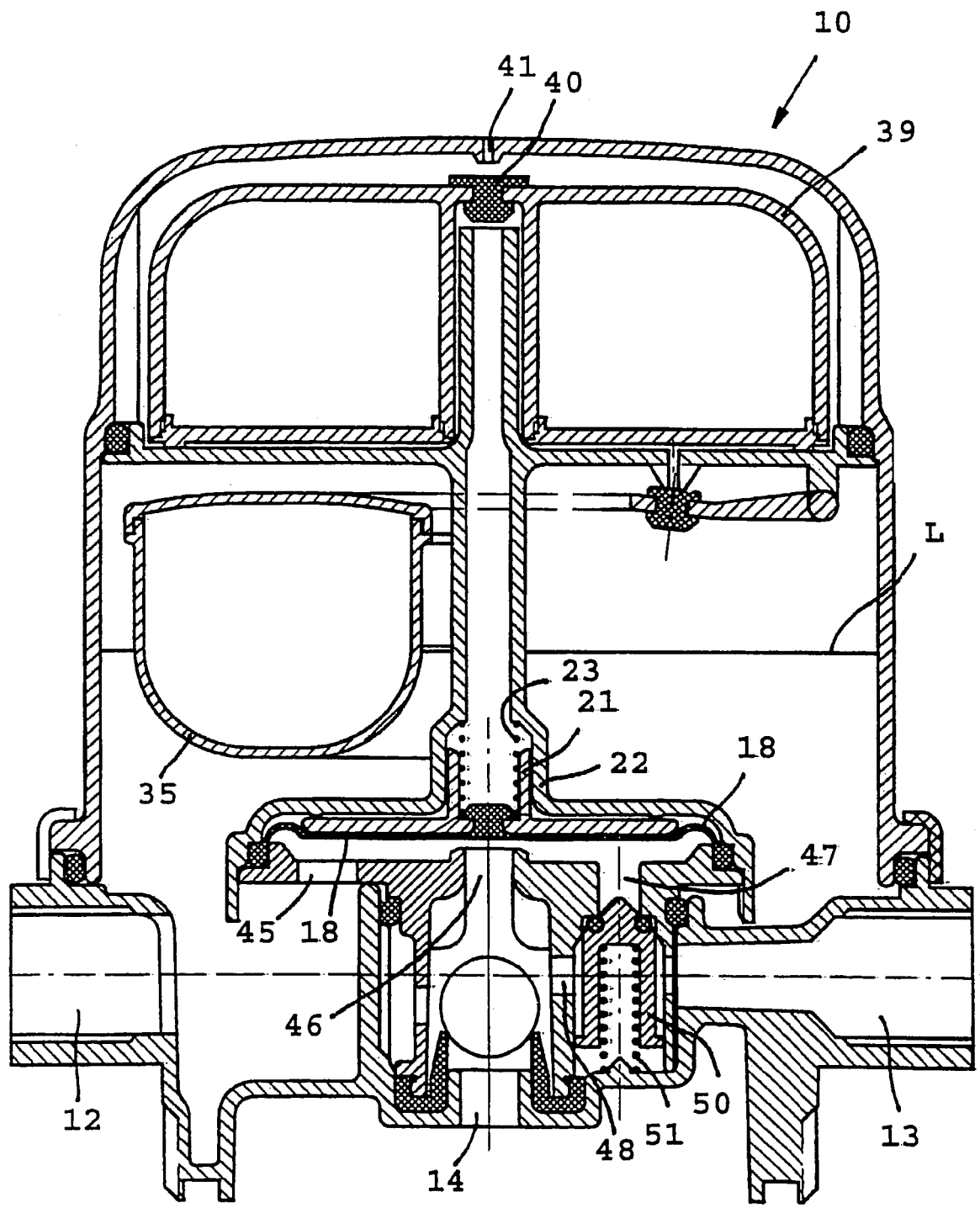
FIG. 4 shows a vertical section through the oil deaeration device according to FIG. 2 when a diaphragm of the oil deaeration device is in an open position.

The oil deaeration device 10 according to the present invention, said device 10 being shown in FIGS. 2–4, comprises a base 11 having a first inlet 12 for the return pipe 9 and an outlet 13 that via the inlet pipe 7 is connected to the pump 3. The base 11 further comprises a second inlet 14 that is connected to the oil tank 5, via the supply pipe 6, and a non-return valve arrangement 15 with a valve ball 16 that, in its position of rest is supported by a valve seat 17. In connection with the base 11 a diaphragm 18 is provided, said diaphragm 18 having its periphery sealingly attached to the periphery of a diaphragm housing 19 that is arranged above the base 11. The diaphragm 18 is designed from a flexible material and via a knob of likewise flexible material connected to a stiff supporting plate 20, from which extends a sleeve 21 that is received in the guiding 22 that is integral with the diaphragm housing 19. A first pressure spring 23 is provided in connection with the sleeve 21 and the guiding 22, said sleeve 21/said diaphragm 18 being displaceable upwards in the guiding 22 in FIG. 2 against the action of the first pressure spring 23.

From the guiding 22 a passage 25 emanates, said passage extending into an upper portion of an oil housing 26 that is included in the oil deaeration device 10, said oil housing 26 being defined by a cover 27 that is provided on top of the base 11. The cover 27 is by means of a first sealing arrangement 28 connected to the base 11. The oil housing 26 is divided into a lower chamber 29 adjacent to the base 11 and an upper chamber 30, said chambers 29, 30 being separated by a partition 31 that via a second sealing arrangement 32 is connected to the inner side of the cover 27. The passage 25 extends through the partition 31.

A first float 35 is provided in the first chamber 29, said first float 35, via an arm 36, being hingedly connected to the partition 31. A first plug 37 of flexible material, located on the arm 36, is intended to cooperate with a first valve opening 38 in the partition 31.

A second float 39 is provided in the upper chamber 30, said second float 39 on its upper side being equipped with a second plug 40 that is intended, to cooperate with the second valve opening 41 in the upper portion of the cover 27.

In the portion of the base 11 that is included in the diaphragm housing 19 a number of openings are provided. Thus, a first opening 45 is provided in connection with the first inlet 12, a second opening 46 is provided in connection with the central portion of the diaphragm 18, a third opening 47 is provided in connection with the outlet 13 and a fourth opening 48 is likewise provided in connection with the outlet 13.

In the base 11 a safety valve is provided, said safety valve having a valve cone 50 that is loaded by a second pressure spring 51 that strives to displace the valve cone 50 to abutment against a seat 52, said valve cone 50 preferably being equipped with an O-ring 53 that seals between the valve cone 50 and the seat 52.

The function of the oil deaeration device 10 will now be described with reference to FIGS. 3 and 4. When the oil supply installation according to FIG. 1 is running oil will be supplied to the first inlet 12 via the return pipe 9, see FIG. 1. The air that is displaced when the oil level L rises in the oil housing 26 is discharged through the first valve opening 38. When the oil level L in the oil housing 26 has risen to a certain level the first-float 35 will be lifted and the first plug 37 closes the first valve opening 38. In connection therewith a pressure is created in the oil deaeration device 10, said pressure, via the first opening 45, acting on the lower side of the diaphragm 18. In FIG. 4 it is shown how the pressure, at a further raised oil level L, displaces the diaphragm 18 in direction upwards in FIG. 4 against the action of the first pressure spring 23. During the displacement upwards of the diaphragm 18 the sleeve 21 will be displaced in the guiding 22. When the diaphragm 18 has been displaced upwards in FIG. 4 the second opening 46 will be free and oil may flow out through this opening 46, further through the fourth opening 48 and escape through the outlet 13. The oil deaeration device 10 functions in its operative state in principle in such a way that an equilibrium is created where both openings 38, 46 simultaneously are open to a certain degree.

When the oil burner 1 is running de oil pump 3 sucks a certain amount of oil per time unit. Since the oil pump 3 normally feeds the oil burner 1 with only a minor part of the oil that is sucked by the oil pump 3 the rest of the oil will be sent back to the oil deaeration device 10 via the return pipe 9. This means that the oil that is discharged through the outlet 13 to a major part constitutes oil that passes through de oil deaeration device 10 and only to a minor part constitutes oil that comes from the tank 5 via the second inlet 14 of the base 11.

If it for instance happens that there is a hole in de diaphragm 18 or a leak is established through the first valve opening 38, despite that the plug 37 assumes the position shown in FIG. 3, oil will rise into the upper chamber 30. In case there is a hole in the diaphragm 18 the oil will enter the upper chamber 30 via the passage 25, the sleeve 21 and the guiding 22 being designed in such a way that oil may pass via a leakage flow. In case the plug 37 is damaged or for some other reason does not perform proper sealing of the first valve opening 38 oil will enter the upper chamber 30 via the first valve opening 38. In both these cases the second float 35 will be elevated when oil enters the second chamber 30. If the cover 27 is manufactured from a transparent material it is possible to determine, by visual inspection, that there is an operations disturbance since oil has entered the second chamber 30. In connection therewith the second plug 40 will seal the second valve opening 41 and it is prevented that oil escapes through the second valve opening 41. When the second plug 40 seals the second valve opening 41, see FIG. 5, the function of the diaphragm 18 ceases due to the fact that the pressure is equal on the both sides of the diaphragm 18. This means that the second opening 46 is no longer free but a larger positive pressure is created inside the oil deaeration device 10. In order to prevent that this positive pressure becomes so high that the oil deaeration device 10 is damaged a safety valve is provided, said safety valve comprising a valve cone 50 and a second pressure spring 51. The pressure spring 51 is designed to allow the valve cone 50 to be displaced downwards at a certain positive pressure, e.g. about 1 bar. Then the O-ring 53 will no longer seal against the seat 52. Oil may now flow out through the third opening 47 and further out through the outlet 13. This is illustrated in FIG. 5.

Figure 5:
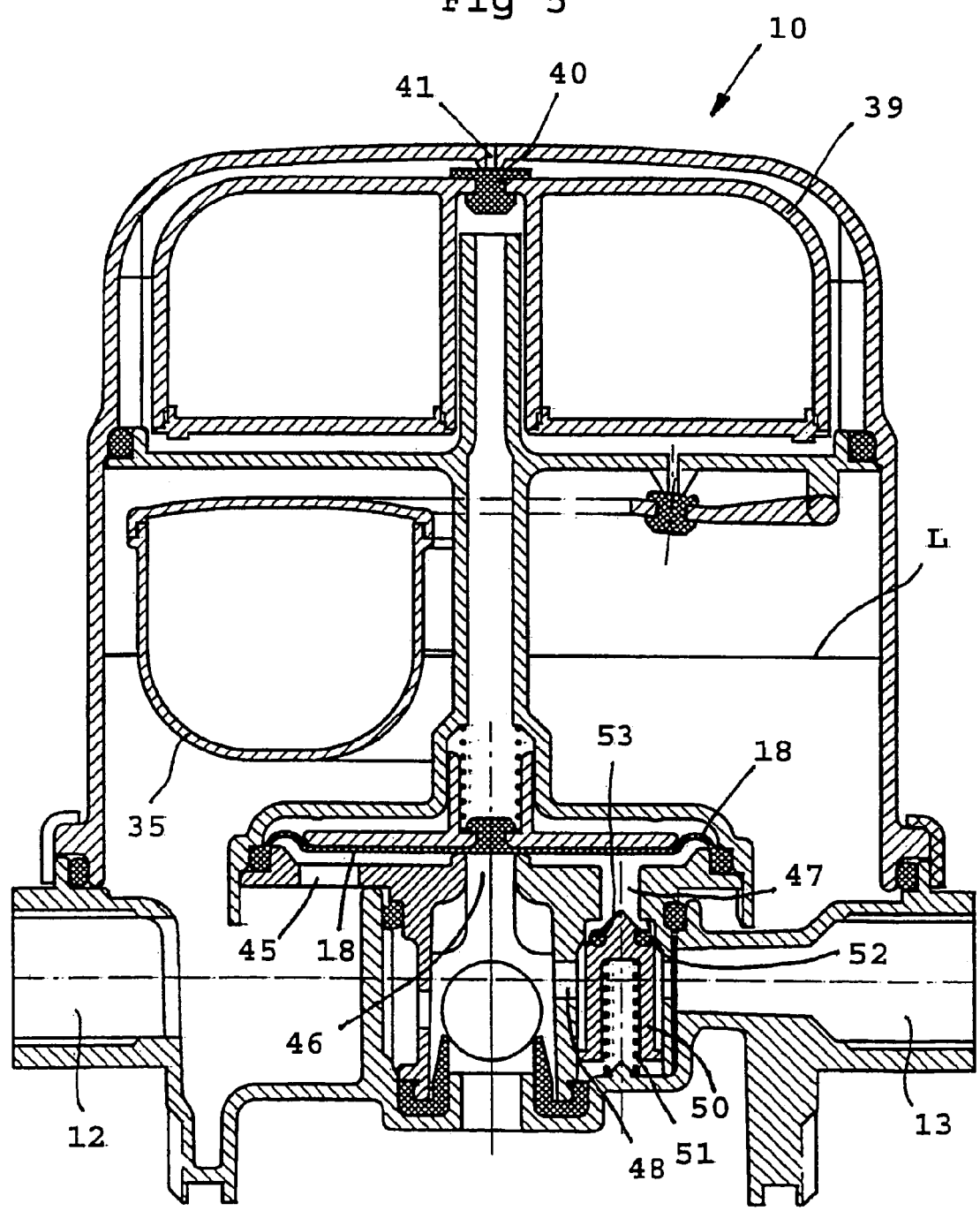
FIG. 5 shows a vertical section through the oil deaeration device according to FIG. 2 when a safety valve, included in the oil deaeration device, is in open position.

Due to the mutual relation of dimensions between de valve cone 50 and the third opening 47, see for instance FIGS. 4 and 5, the surface of the valve cone 50 that the pressure acts upon will increase to an essential degree when the valve cone 50 is displaced downwards. This means that after the safety valve 50, 51 has opened for a certain positive pressure the safety valve 50, 51 will remain open also for a lower positive pressure since there is an increase of the surface that the pressure acts upon. This is favourable since the oil deaeration device 10 is not subjected to an unnecessary large positive pressure during a longer time.

Figure 6:
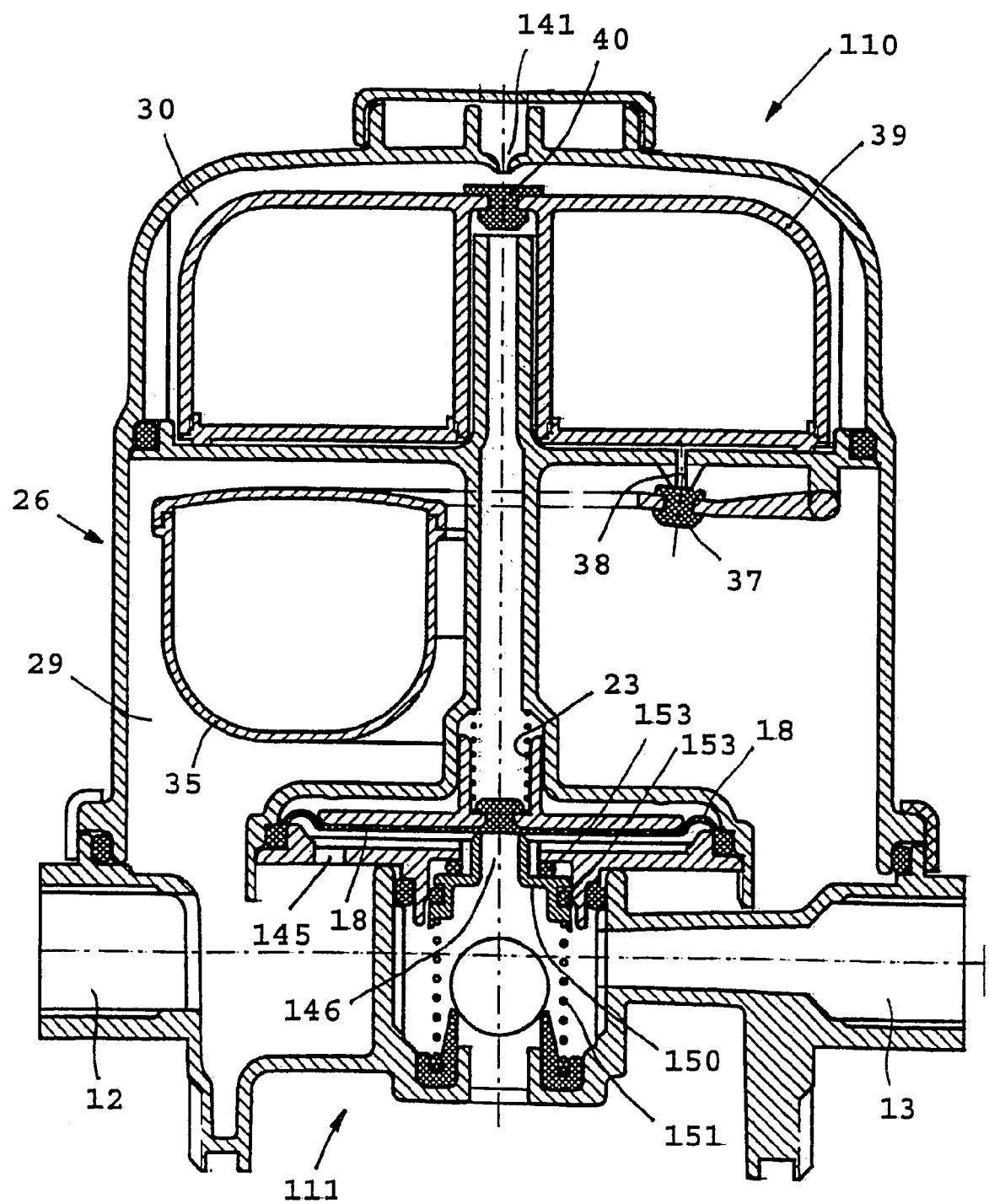
FIG. 6 shows a vertical section through an alternative embodiment of an oil deaeration device according to the present invention.

The alternative embodiment, shown in FIG. 6, of an oil deaeration device 110 according to the present invention differs from the oil deaeration device 10, described above in connection with FIGS. 2–5, in principle only by the location of the safety valve 150. When the oil deaeration device 110 according to FIG. 6 functions normally the first float 35 will be elevated and the first plug 37 seals a first valve opening 38. In connection therewith a pressure is created in the oil deaeration device 110, said pressure, via the first opening 145, acting on the lower side of the diaphragm 18 that is displaced upwards against the action of the first pressure spring 23. When the diaphragm 18 has been displaced upwards in FIG. 6 the second opening 146 will be free and oil may flow out through these opening 146 and further out through the outlet 13. In principle, the oil deaeration device 110 functions in its operative state in a corresponding way as the oil deaeration device 10.

If it for instance happens that there is a hole in the diaphragm 18 or a leak is established through the first valve opening 38, despite that the plug 37 assumes the position shown in FIG. 6, oil will rise into the upper chamber 30. In both these cases the second float 39 will be elevated when the oil enters the second chamber 30. In connection therewith the second plug 40 will seal the second valve opening 141 and it is prevented that oil escapes through the second valve opening 141. The function of the diaphragm 18 ceases since the pressure will be equal on the both sides of the diaphragm 18. This means that the second opening 146 is no longer free but a positive pressure is created inside the oil deaeration device 10. This positive pressure will act on the upper side of the valve cone 150 that is displaced downwards against the action from a second pressure spring 151. The pressure spring 151 is designed to allow the valve cone 150 to be displaced downwards at a certain positive pressure, e.g. about 1 bar. Then the O-rings 153 will no longer perform sealing. Oil may now bypass the top of the valve cone 153 and flow out through the outlet 13. In a corresponding way as the valve cone 50 the valve cone 150 is designed in such a way that the surface of the valve cone 150, that the pressure acts upon, increases to an essential degree when the valve cone 150 is displaced downwards.

Feasible Modifications of the Invention

In the embodiments described above the safety valve 50, 51; 150, 151 is designed in a special way that brings about a decrease in the positive pressure in the oil deaeration device 10; 110 compared to the initial positive pressure that effects opening of the safety valve 50, 51; 150, 151. However, it is not necessary that the safety valve has this function and generally the safety valve may be designed in several different ways within the scope of the present invention. The primary demand on the safety valve is that it will open for a predetermined differential pressure on the upper side and the lower side of the safety valve.

The invention claimed is:

1. Oil deaeration device (10) that comprises a base (11) and an oil housing (26), said base (11) being equipped with a first and a second inlet (12, 14), an outlet (13), a float (35) provided in the oil housing (26) and a diaphragm (18) provided in the oil housing (26), that the oil housing (26) is divided into two chambers (29, 30), that the float (35) is provided in a first chamber (29), and that a further float (39) is provided in a second chamber (30), characterized in that the diaphragm (18) on one side is connected to the first chamber (29), that the diaphragm (18) on its other side is connected to the second chamber (30), that a safety valve (50, 51; 150, 151) is provided in connection with the outlet (13), and that the safety valve (50, 51; 150, 151) communicates with the outlet (13) in its open position.

2. Oil deaeration device according to claim 1, characterized in that the safety valve (50, 51; 150, 151) is provided in the base (11; 111).

3. Oil deaeration device according to claim 2, characterized in that a first valve opening (38) is provided between the chambers (29, 30), and that the float (35) that is provided in the first chamber (29) is equipped with means (37) to close said valve opening (38) when the float (35) assumes an elevated position.

4. Oil deaeration device according to claim 1, characterized in that the oil housing (26) comprises a cover (27) that in its upper portion has a second valve opening (41), and that the further float (39) is equipped with means to close said second valve opening (41) when the further float (39) assumes an elevated position.

5. Oil deaeration device according to claim 1, characterized in that the diaphragm (18) is affected by a first spring (23) that strives to urge the diaphragm (18) to abutment against a second opening (46; 146) in the base (11), and that the second opening (46; 146) in free position connects the first inlet (12) with the outlet (13).

6. Oil deaeration device according to claim 1, characterized in that the safety valve (50, 51; 150, 151), in closed position, is designed to expose a first surface for the pressure to act upon, that in open position the safety valve (50, 51; 150, 151) exposes a second surface for the pressure to act upon, and that the second surface is larger than the first surface.

7. Oil deaeration device according to claim 6, characterized in that the first surface is incorporated in the second surface.

8. Oil deaeration device according to claim 1, characterized in that the safety valve (50, 51; 150, 151) is equipped with at least one O-ring (53; 153).

9. Oil deaeration device according to claim 1, characterized in that a first valve opening (38) is provided between the chambers (29, 30), and that the float (35) that is provided in the first chamber (29) is equipped with means (37) to close said valve opening (38) when the float (35) assumes an elevated position.

* * * * *